United States Patent
Bell

(10) Patent No.: US 6,405,027 B1
(45) Date of Patent: Jun. 11, 2002

(54) GROUP CALL FOR A WIRELESS MOBILE COMMUNICATION DEVICE USING BLUETOOTH

(75) Inventor: John R. Bell, Fremont, CA (US)

(73) Assignee: Philips Electronics N.A. Corporation, New York, NY (US)

( * ) Notice: Subject to any disclaimer, the term of this patent is extended or adjusted under 35 U.S.C. 154(b) by 0 days.

(21) Appl. No.: 09/456,899

(22) Filed: Dec. 8, 1999

(51) Int. Cl.[7] .............................................. H04M 13/00
(52) U.S. Cl. ........................ 455/403; 455/416; 455/463; 455/41
(58) Field of Search ................................ 455/403, 414, 455/416, 417, 462, 463, 41

(56) References Cited

U.S. PATENT DOCUMENTS

| | | | |
|---|---|---|---|
| 5,485,520 A | 1/1996 | Chaum et al. | 380/24 |
| 5,506,837 A | 4/1996 | Sollner et al. | 370/31 |
| 6,069,588 A | * 5/2000 | O'Neill, Jr. | 343/713 |
| 6,255,800 B1 | * 7/2001 | Bork | 455/463 |
| 6,263,503 B1 | * 7/2001 | Margulis | 725/81 |

FOREIGN PATENT DOCUMENTS

EP 0796024 A2 9/1997 ............ H04Q/7/36

OTHER PUBLICATIONS

Bluetooth Specification, Version 1.0, Foundation, Jul. 22, 1999, Adopted by Bluetooth Special Interest Group, vol. 2 (Profiles), p. 148.

* cited by examiner

Primary Examiner—Thanh Cong Le
Assistant Examiner—Thuan T. Nguyen
(74) Attorney, Agent, or Firm—Jack D. Slobod

(57) ABSTRACT

A mobile communication handset which is configured for communicating by a cellular or PCS or cordless call over a first wireless link to a base station, and is also configured for communicating with one or more other communication devices over other respective wireless direct device-to-device second links implemented by the Bluetooth Intercom Profile, is provided with functionality to carry on a group call by appropriately combining speech signals carried by the various links and by the handset. The first wireless link may be a cordless link which is implemented by the Bluetooth Telephony Profile. Alternatively, the first link may also be configured as wireless direct device-to-device link, in which case all wireless links involved in the group call are implemented by the Bluetooth Intercom Profile.

20 Claims, 4 Drawing Sheets

US 6,405,027 B1

GROUP CALL FOR A WIRELESS MOBILE COMMUNICATION DEVICE USING BLUETOOTH

BACKGROUND OF THE INVENTION

1. Field of the Invention

The present invention relates to a mobile communication device or handset capable of at least two wireless communication links, at least one of which is with another communication device over a direct device-to-device link without any intervening base station. In its particular aspects, the present invention relates to such a mobile communication device in which the wireless direct device-to-device link is implemented in accordance with the Bluetooth Intercom profile.

2. Description of the Related Art

Such a wireless communication device is known from Bluetooth Specification, Version 1.0, Foundation, Jul. 22, 1999, adopted by the Bluetooth Special Interest Group, (hereafter the "Bluetooth specification"), in particular at Volume 2 (Profiles), page 148.

The Bluetooth specification includes the definition of the protocols and procedures to be used by devices implementing the wireless intercom part of a use case called "3-in-1 phone", typically including a direct speech link between two devices, established using telephony based signaling. A typical scenario is a speech call between two (cellular) phones implemented by a direct phone-to-phone wireless connection using Bluetooth only.

However, the Bluetooth specification does not consider the possibility of a group call functionality to allow a first phone to use a Bluetooth link to conference a second phone into a cellular call with a remote third phone, or to allow three or more phones to participate in a group conversation implemented entirely via Bluetooth Intercom links.

It is known to include conference or multi-party call functionality in networks, PBXs, multi-line wired phones, and cordless base stations, but not in mobile phones or entirely wireless communication terminals.

OBJECTS AND SUMMARY OF THE INVENTION

It is an object of the present invention to provide a communication device configured for communicating over a first wireless link, and also configured for communicating with one or more other communication devices over other respective wireless direct device-to-device second links, with functionality to carry on a group call by appropriately combining speech signals carried by the various links.

It is a further object that this group call functionality be provided in the case where the one or more second links are implemented by the Bluetooth Intercom Profile and/or the first wireless link is a direct device-to-device link implemented by the Bluetooth Intercom Profile to still another communication device.

These and other objects of the present invention are satisfied by providing such a communication device wherein means for carrying a local side of a call over the first wireless link and the local sides of the one or more second wireless links may be active simultaneously, and includes group call combining means for forming the signals applied to a local end, the signals applied to a first call over the first link, and the signals applied to a second call over the second link, such that the signals applied to the local end include contributions from the signals derived from the remote ends of the first and second calls, the signals applied to said first call include contributions from the signals derived from the local and second ends, and the signals applied to the second call include contributions derived from the local and first ends.

The present invention is also characterized in that said first link either includes a cellular or PCS or cordless wireless link to a base station or is a direct device-to-device link to still another communication device, without any intervening base station.

The present invention is further characterized in that the one or more wireless direct device-to-device links are implemented in accordance with the Bluetooth Intercom Profile. In a further embodiment, the first link is a cordless link implemented in accordance with the Bluetooth Telephony profile.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1A:
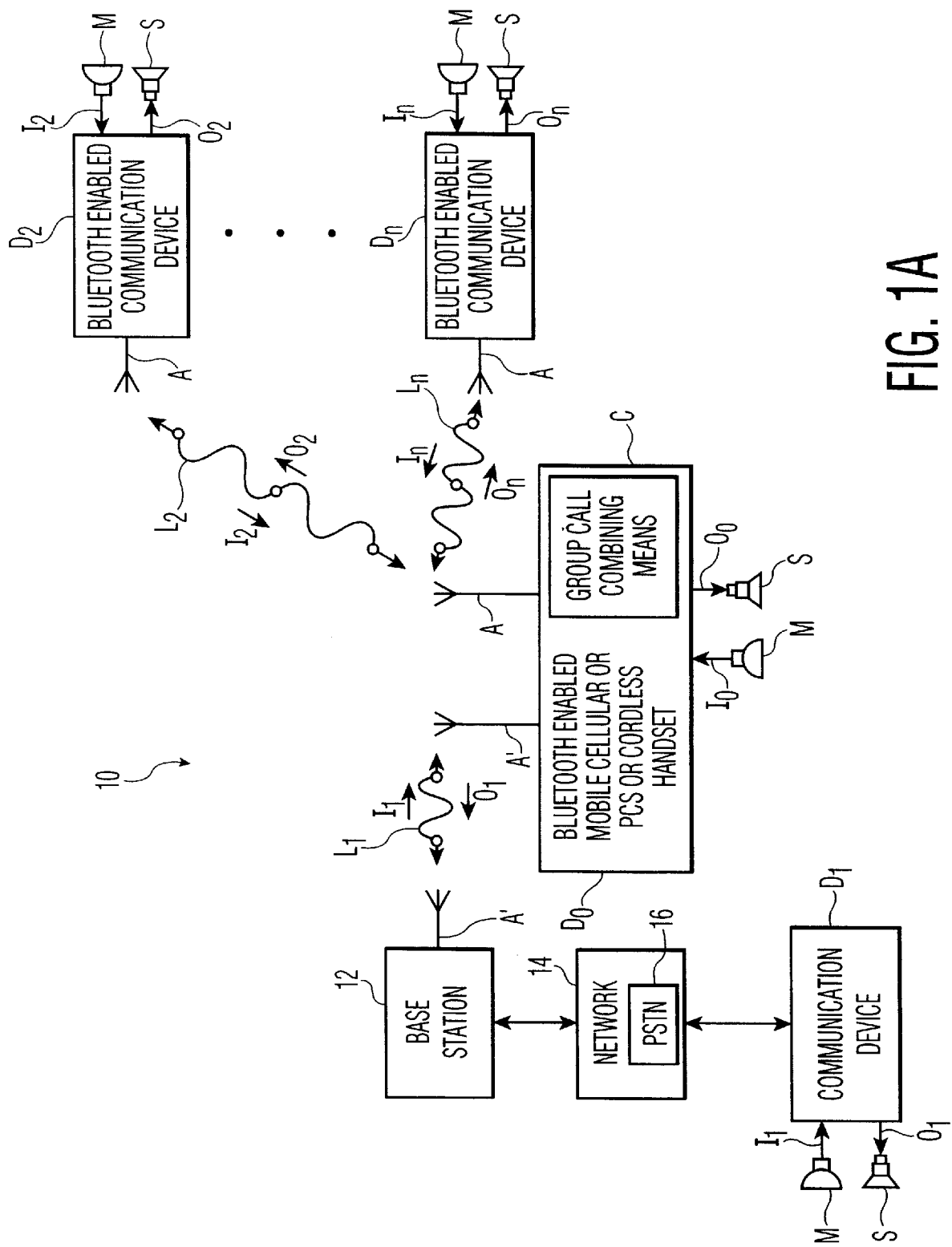
FIG. 1A is a schematic diagram illustrating a communication device in the form of a mobile handset $D_0$ engaged in a group call with a plurality of other communication devices $D_1$ through $D_n$ over respective communication paths in accordance with a first aspect of the present invention, wherein the communication path between handset $D_0$ and device $D_1$ includes a wireless link to an intervening base station, and the respective communication paths between handset $D_0$ and the devices $D_2$ to $D_n$ are wireless direct device-to-device links.

Referring first to FIG. 1A of the drawing, there is shown a first group call arrangement 10 in which communication device or terminal $D_0$ is a Bluetooth enabled mobile cellular or PCS (e.g. AMPS, GSM, TDMA, CDMA) or cordless handset (e.g. FM, spread spectrum, DECT, Bluetooth telephony profile) configured for carrying on a local side of a call to a remote communication device $D_1$, such as a telephone, over a communication path which includes a wireless cellular, PCS, or cordless duplex link $L_1$ to a base station 12. As is conventional for such a call, the communication path also includes network infrastructure 14 interposed between base station 12 and remote communication device $D_1$, which infrastructure typically includes the public switched telephone network (PSTN) 16.

Further in FIG. 1A, the communication devices or terminals $D_2$ through $D_n$ are engaged in calls with handset or device $D_0$ over respective wireless direct device-to-device duplex links, each using the Bluetooth Intercom profile.

Devices $D_2$ through $D_n$ may be any mobile or fixed Bluetooth enabled communication terminals, including but not limited to Bluetooth enabled mobile cellular, PCS, or cordless handsets like $D_0$. However, only the Bluetooth intercom call capability of devices $D_2$ through $D_n$ is pertinent to group call arrangement 10. Most conveniently, device $D_0$ simultaneously participates in the calls with devices $D_2$ through $D_n$ by acting as the master of a single Bluetooth piconet including those devices. However, it also possible for the group call to be maintained where devices $D_2$ to $D_n$ are not in a same piconet mastered by device $D_0$.

Each of devices $D_0$ and devices $D_2$ through $D_n$ have its own transmit and receive antenna for supporting the various wireless duplex links $L_2$ to $L_n$ for Bluetooth Intercom Profile communications. In general, device $D_0$ also has a separate transmit and receive antenna A' for supporting the cellular or PCS or cordless link $L_1$ with a corresponding antenna A' of base station 12. If the cordless link $L_1$ is implemented using the Bluetooth Telephony Profile, link $L_1$ can also be supported by antenna A. Thus, in that case device $D_0$ need have only one antenna A and the antenna of base station 12 will also be a Bluetooth antenna A.

Further, each of the communication devices or terminals $D_0$ through $D_n$ has its own acoustic-to-electrical transducer or microphone M and its own electrical-to-acoustic transducer or speaker S. The electrical signals produced by acoustic-to-electrical transducers M of the devices $D_0$ to $D_n$ are denominated $I_0$ to $I_n$, respectively, whereas the electrical signals applied to electrical-to-acoustic transducers S of the devices $D_0$ to $D_n$ are denominated $O_0$ to $O_n$, respectively. From the point of view of device $D_0$, the signal $I_0$ may be viewed as being derived from a local end, and the signals $I_1$ through $I_n$ as being derived from respective far ends of calls over or including the links $L_1$ to $L_n$. Similarly, the signal $O_0$ may be viewed as being applied to the local end, and the signals $O_1$ through $O_n$ as being applied to the respective calls for ultimate application to the far ends thereof.

In order to carry on a group call, device $D_0$ includes group call combining means C for forming the signals applied to the local end, and the signals applied to each call such that the signals applied to the local end is or includes the sum of the signals derived from the remote ends of the calls, and the signals applied to each call is or includes the sum of the signals derived from the local end and from the remote ends of the other calls.

The following equations set forth the relationships for forming the signals $O_0$ through $O_n$ from the signals $I_0$ through $I_n$:

$$O_0 = I_1 + I_2 + I_3 + \ldots I_{n-1} + I_n$$
$$O_1 = I_0 + I_2 + I_3 + \ldots I_{n-1} + I_n$$
$$O_2 = I_0 + I_1 + I_3 + \ldots I_{n-1} + I_n$$
$$\vdots$$
$$O_n = I_0 + I_1 + I_2 + I_3 + \ldots I_{n-1}$$

Figure 3:
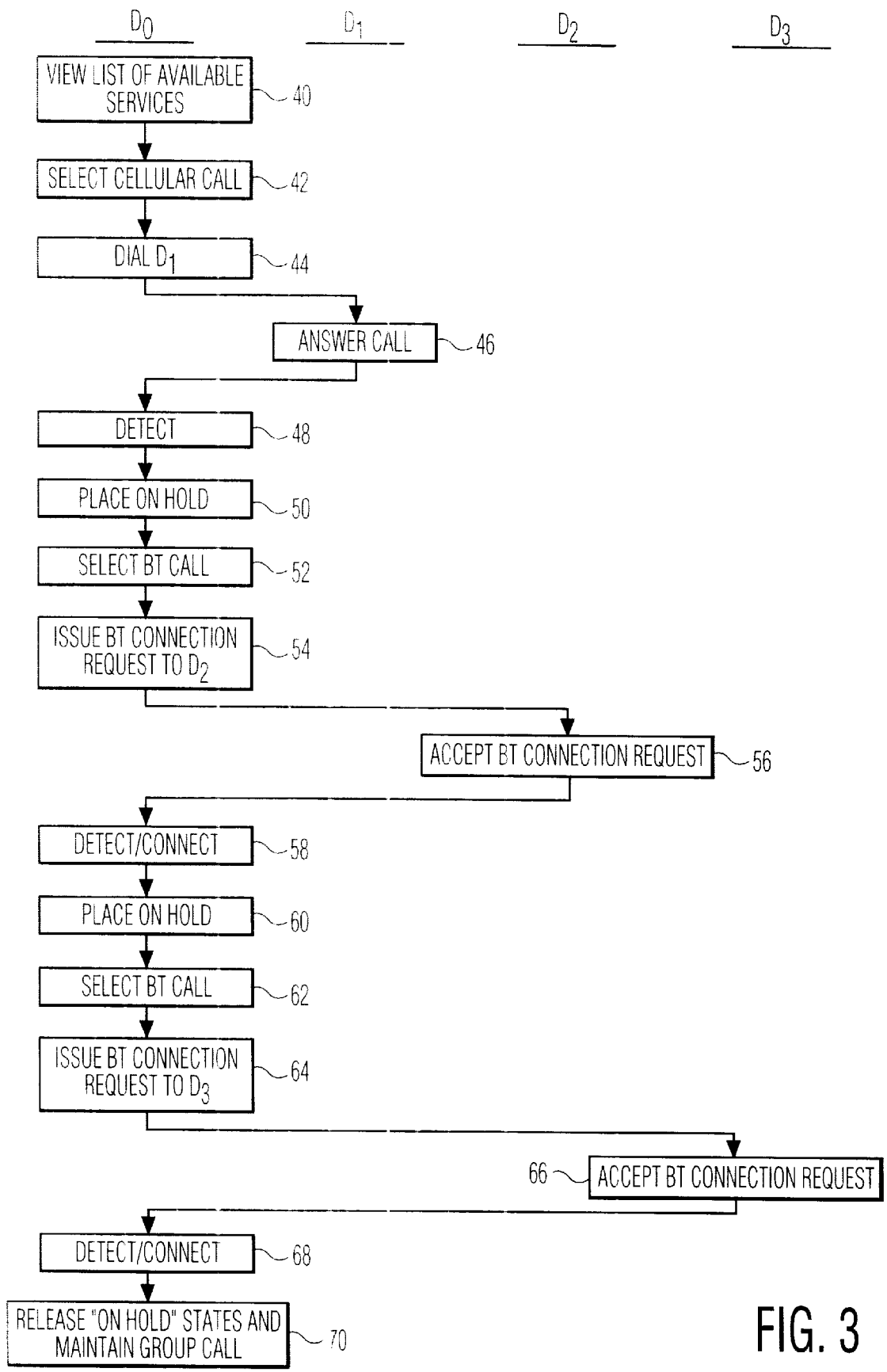
FIG. 3 is a flow chart of acts for setting up and maintaining a group call in accordance with FIG. 1A, between mobile handset $D_0$ and communication devices $D_1$ through $D_3$.

In an exemplary case where n=3, such that there are four parties to a group call corresponding to the flow chat of FIG. 3, the foregoing equations simplify to:

$$O_0 = I_1 + I_2 + I_3$$
$$O_1 = I_0 + I_2 + I_3$$
$$O_2 = I_0 + I_1 + I_3$$
$$O_3 = I_0 + I_1 + I_2$$

Figure 1B:
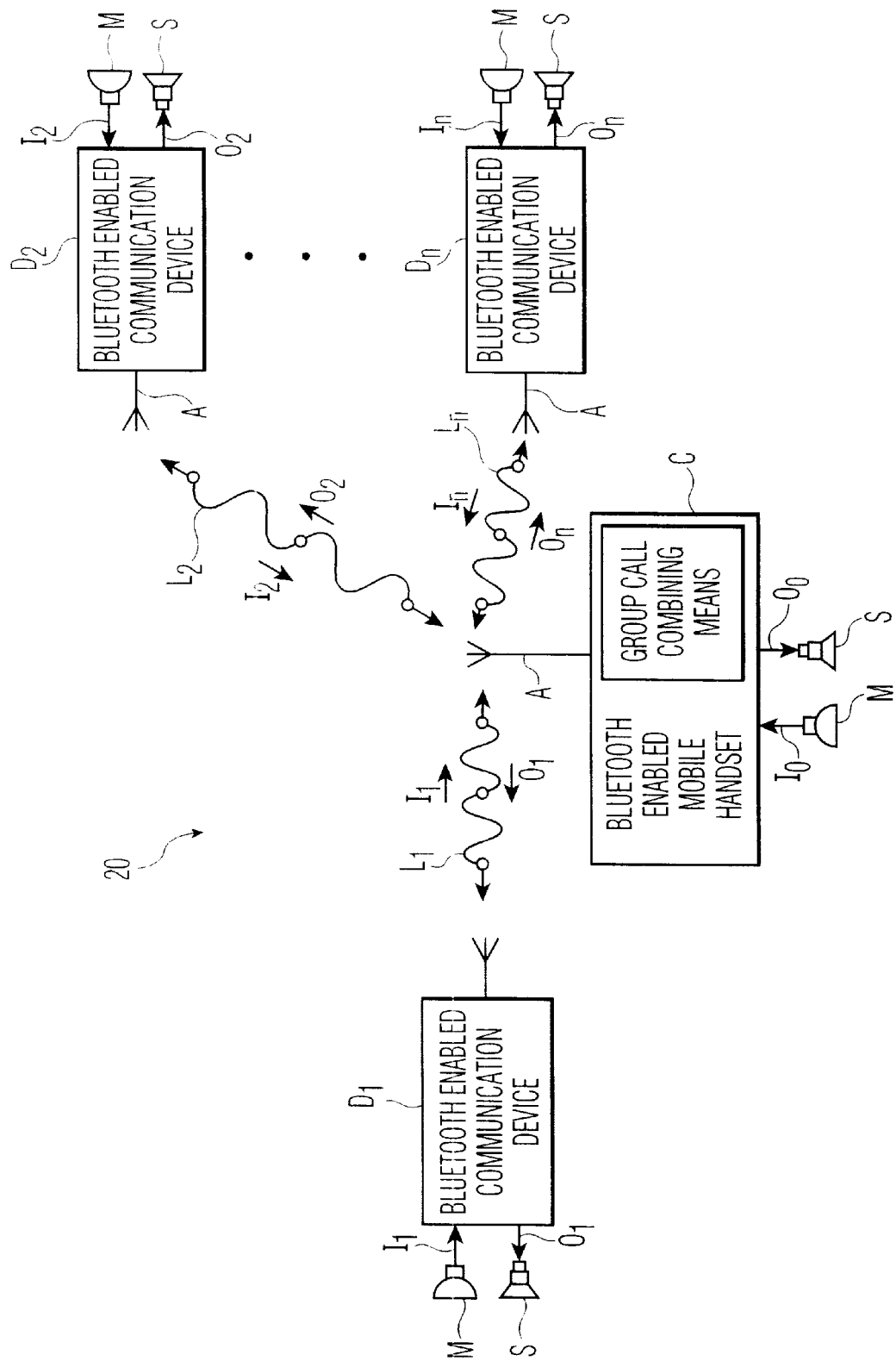
FIG. 1B is a schematic diagram illustrating communication device $D_0$ engaged in a group call with a plurality of other communication devices $D_1$ through $D_n$ over respective communication paths all of which are wireless direct device-to-device links, in accordance with a second aspect of the present invention.

FIG. 1B shows an arrangement 20 which differs from arrangement 10 in FIG. 1A principally in that device $D_1$ is a Bluetooth enabled communication device similar to devices $D_2$ through $D_n$ and wireless duplex link $L_1$ between device $D_0$ and device $D_1$ is also a direct device-to-device link implemented in accordance with the Bluetooth Intercom Profile. Thus, for this configuration, all of wireless links $L_1$ through $L_n$ are Bluetooth intercom links, preferably but not necessarily in a same Bluetooth piconet mastered by device $D_0$, and any other communication modes of devices $D_0$ through $D_n$ are not pertinent to the illustrated group call. Therefore in FIG. 1B, communication device $D_0$ is merely denominated a Bluetooth enabled mobile handset. As in FIG. 1A, device $D_0$ includes group call combining means C which is arranged for forming the signals applied to the local end, and the signals applied to each call such that the signals applied to the local end includes contributions from the signals derived from the remote ends of the calls, and the signals applied to each call includes contributions from the signals derived from the local end and from the remote ends of the other calls.

Figure 2:
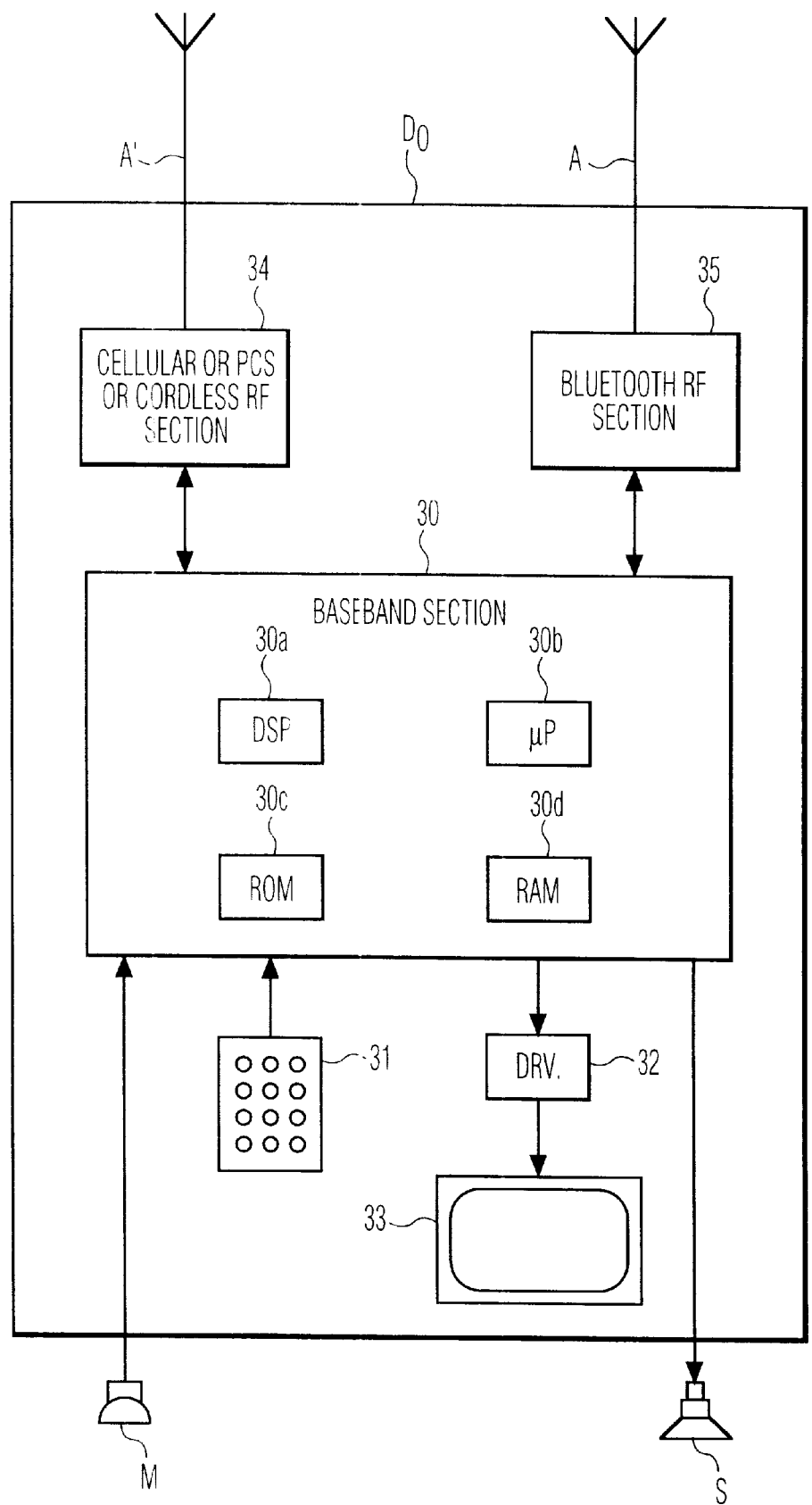
FIG. 2 is a mobile handset $D_0$ capable of implementing a group call in accordance with FIG. 1A or in accordance with FIG. 1B.

The mobile handset $D_0$ illustrated in FIG. 2 is seen to comprise in communication with a baseband section 30, the microphone M and speaker S, a numeric keypad 31, and a driver 32 for a display 33, e.g. an LCD screen. Baseband section 30 includes a digital signal processor (DSP) 30a and microprocessor 30b, a non-volatile memory or ROM 30c, at least a portion of which is programmable, in which is stored firmware constituting programs and data for operation of DSP 30a and microprocessor 30b, including for steering the setup of a cellular or PCS or cordless call, for steering the set up of one or more Bluetooth intercom calls, and for combining these calls into a group call by appropriately combining and distributing audio signals, and also a volatile memory or RAM 30d, for temporary storage in conjunction with program execution. Device $D_0$ also includes a cellular or PCS (e.g. AMPS, GSM, TDMA, CDMA) or cordless (e.g. FM, spread spectrum, DECT, Bluetooth telephony profile) RF section 34 and a Bluetooth RF Section 35, typically operating in the unregulated 2.4 GHz band. RF sections 34 and 35 are interposed between baseband section 30 and antennas A' and A, respectively. As should now be apparent, if the cordless functionality is implemented by the Bluetooth Telephony Profile, this can be done via Bluetooth RF Section 35 and antenna A. In that case, RF section 34 and antenna A' can be dispensed with.

FIG. 3 is an exemplary flow chart showing setup of a group call in accordance with the arrangement 10 of FIG. 1A simplified to four devices $D_0$, $D_1$, $D_2$, and $D_3$, wherein a cellular call between devices $D_0$ and $D_1$ is set up before the Bluetooth intercom calls between devices $D_0$ and $D_2$ and between devices $D_0$ and $D_3$ are successively set up. It should also be appreciated that the cellular call could be set up after one or both of the Bluetooth calls. Further, if the cordless call were dispensed with, there would result a group call among three communication devices solely via Bluetooth intercom links in the nature of the arrangement of FIG. 1B.

Referring to FIG. 3, the setup of the exemplary group call begins with the user of device $D_0$ at block 40 viewing a list of available services on the display 33, which would list among other things e.g. "cellular call" and "Bluetooth call". The user would select "cellular call" at block 42, e.g. by pressing one or more keys of keypad 31 or by virtue of speech recognition implemented by baseband section 30, and dial device $D_1$ at block 44. Then at block 46 the user of device $D_1$ would answer the call, and this would be detected by device $D_0$ at block 48.

Next, the cellular call with device $D_1$ could be placed in an "on hold" state by device $D_0$ at block 50 in which state device $D_0$ provides any necessary control signaling to maintain the cellular call, and the user of device $D_0$ then selects "Bluetooth call" from the list at block and causes a Bluetooth connection request to be issued to device $D_2$ at block 54.

At block 56, the user of device $D_2$ causes the Bluetooth connection request to be accepted, and this acceptance is detected and the connected is completed by device D0 at block 58. Then, this Bluetooth call may be placed "on-hold" or in an idle state at block 60, in which state device $D_0$ provides any necessary control signaling to maintain the Bluetooth intercom call.

The user of device $D_0$ then selects "Bluetooth call" again from the list at block 62 and causes a Bluetooth connection request to be issued to device $D_3$ at block 64. Then at block 66, the user of device $D_3$ causes the Bluetooth connection request to be accepted, and this acceptance is detected and the connected is completed by device D0 at block 68.

Lastly, the device $D_0$ releases the calls with devices $D_1$ and $D_2$ from their "on hold" states and maintains the group call among devices $D_0$ through $D_3$ by appropriately combining and distributing audio signals in accordance with the relationships aforementioned.

It should now be appreciated that the objects of the present invention have been satisfied. While the present invention has been described in particular detail, it should also be appreciated that numerous modifications are possible within the intended spirit and scope of the invention. In interpreting the appended claims it should be understood that:

a) the word "comprising" does not exclude the presence of other elements or acts than those listed in a claim;

b) the word "a" or "an" preceding an element does not exclude the presence of a plurality of such elements.

c) any reference signs in the claims do not limit their scope; and d) several "means" may be represented by the same item of hardware or software implemented structure or function.

What is claimed is:

1. A mobile communication device comprising:

a local end comprising an electrical-to-acoustic transducer and an acoustic-to-electrical transducer;

means for carrying on a local side of a first call to a remote end thereof via a first wireless link, in which signals derived from the local end are applied to said first call for transmission to the remote end thereof and signals derived from the remote end of the first call are applied to the local end; and means for carrying on a local side of at least a second call to a remote end thereof comprising another communication device via a direct device-to-device second wireless link, without any intervening base station, in which signals derived from the local end are applied to said second call for transmission to the remote end thereof and signals derived from the remote end of the second call are applied to the local end;

wherein the means for carrying on the local sides of the first and second calls can be active simultaneously; and further comprising group call combining means for forming the signals applied to said local end, the signals applied to said first call, and the signals applied to said second call, such that the signals applied to the local end include contributions from the signals derived from the remote ends of the first and second calls, the signals applied to said first call include contributions from the signals derived from said local and second ends, and the signals applied to said second call include contributions derived from said local and first ends.

2. The device as claimed in claim 1, wherein said first wireless link is to a base station.

3. The device as claimed in claim 2, wherein said first wireless link is a cellular or PCS link.

4. The device as claimed in claim 2, wherein said first wireless link is a cordless link.

5. The device as claimed in claim 1, wherein said first wireless link is also a direct device-to-device link to still another communication device, without any intervening base station.

6. The device as claimed in claim 1, wherein said direct device-to-device second link is implemented in accordance with the Bluetooth Intercom Profile.

7. The device as claimed in claim 2, wherein said direct device-to-device second link is implemented in accordance with the Bluetooth Intercom Profile.

8. The device as claimed in claim 3, wherein said direct device-to-device second link is implemented in accordance with the Bluetooth Intercom Profile.

9. The device as claimed in claim 4, wherein said direct device-to-device second link is implemented in accordance with the Bluetooth Intercom Profile.

10. The device as claimed in claim 5, wherein said direct device-to-device first and second links are implemented in accordance with the Bluetooth Intercom Profile.

11. The device as claimed in claim 9, wherein said cordless link is implemented in accordance with the Bluetooth Telephony Profile.

12. A program stored in or among one or more memories which is for execution by a processor within a mobile communication device which includes a local end comprising an electrical-to-acoustic transducer and an acoustic-to-electrical transducer, said program being configured for steering:

carrying on a local side of a first call to a remote end thereof via a first wireless link, in which signals derived from the local end are applied to said first call for transmission to the remote end thereof and signals derived from the remote end of the first call are applied to the local end; and carrying on a local side of at least a second call to a remote end thereof comprising another communication device via a direct device-to-device second wireless link without any intervening base station, in which signals derived from the local end are applied to said second call for transmission to the remote end thereof and signals derived from the remote end of the second call are applied to the local end;

wherein the local sides of the first and second calls are active simultaneously; and forming the signals applied to said local end, the signals applied to said first call, and the signals applied to said second call, to maintain a group call such that the signals applied to the local end include contributions from the signals derived from the remote ends of the first and second calls, the signals applied to said first call include contributions from the signals derived from said local and second ends, and the signals applied to said second call include contributions derived from said local and first ends.

13. The program as claimed in claim 12, wherein said first wireless link is to a base station.

14. The program as claimed in claim 13, wherein said first wireless link is a cellular or PCS link.

15. The program as claimed in claim 13, wherein said first wireless link is a cordless link.

16. The program as claimed in claim 12, wherein said first wireless link is also a direct device-to-device link to still another communication device, without any intervening base station.

17. The program as claimed in claim 12, wherein said direct device-to-device second link is implemented in accordance with the Bluetooth Intercom Profile.

18. The program as claimed in claim 13, wherein said direct device-to-device second link is implemented in accordance with the Bluetooth Intercom Profile.

19. The program as claimed in claim 15, wherein said direct device-to-device second link is implemented in accordance with the Bluetooth Intercom Profile.

20. The program as claimed in claim 19, wherein said cordless link is implemented in accordance with the Bluetooth Telephony Profile.

* * * * *